United States Patent
Ueno et al.

(10) Patent No.: US 6,512,046 B2
(45) Date of Patent: Jan. 28, 2003

(54) POLYMERIZABLE UNSATURATED POLYESTER RESIN COMPOSITION

(75) Inventors: Shinya Ueno, Osaka (JP); Toshio Mita, Osaka (JP); Hidefumi Matsuya, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/835,835

(22) Filed: Apr. 17, 2001

(65) Prior Publication Data

US 2002/0022695 A1 Feb. 21, 2002

(30) Foreign Application Priority Data

Apr. 17, 2000 (JP) ..................... P2000-115276

(51) Int. Cl.$^7$ ................ C08L 67/07; C09D 167/07
(52) U.S. Cl. .................. 525/39; 525/7.4; 525/41; 525/42; 521/48.5; 528/297; 528/301; 528/304
(58) Field of Search ................ 525/39, 41, 42, 525/7.4; 521/48.5; 528/297, 301, 304

(56) References Cited

U.S. PATENT DOCUMENTS 3,933,939 A * 1/1976 Isozaki ................ 522/107
3,951,886 A * 4/1976 Miyake ................ 521/48.5

FOREIGN PATENT DOCUMENTS

| EP | 0 624 609 A2 | 5/1993 |
| EP | 0 739 922 A1 | 4/1995 |
| WO | WO 98/18874 | 10/1996 |

* cited by examiner

*Primary Examiner*—Patricia A. Short
(74) *Attorney, Agent, or Firm*—Armstrong, Westerman & Hattori, LLP

(57) ABSTRACT

A practical polymerizable unsaturated polyester resin composition is provided, wherein a polyester skeleton derived from collected PET is introduced, for effective utilization of waste PET such as a PET bottle which has recently been considered a large obstacle to environmental protection. The polymerizable unsaturated polyester resin composition comprises a straight-chain polyester (A) having a (meth)acryloyl group at both ends of molecules and an ethylenically unsaturated monomer (B), said straight-chain polyester (A) having a (meth)acryloyl group at both ends of molecules being obtained by reacting: (a) a terephthalate oligomer having a hydroxyl group at both ends of molecules resulted from the alcoholysis reaction of collected waste polyethylene terephthalate by an aliphatic glycol having an ether bond, (b) a dibasic acid containing an aromatic dibasic acid as a principal component, and (c) a glycidyl meth)acrylate.

8 Claims, 1 Drawing Sheet

POLYMERIZABLE UNSATURATED POLYESTER RESIN COMPOSITION

BACKGROUND OF THE INVENTION

1. Field of the Invention

The present invention relates to a method of chemically recycling waste polyethylene terephthalate such as polyethylene terephthalate (hereinafter referred to as PET) bottles. More particularly, the present invention relates to a polymerizable unsaturated resin composition which contains a polyester skeleton derived from polyethylene terephthalate as a resin skeleton of a radical polymerizable resin and also has an excellent low-temperature curing property, and maintains practical physical properties such as elongation, toughness, flexibility, and strength, wherein PET, which is capable of curing completely even in the presence of air, is used as an essential raw component in an effective method utilizing collected PET.

2. Description of Related Art (Meth)acryloyl group-containing polyester resin compositions comprising a straight-chain polyester having a (meth)acryloyl group at both ends of molecules and an ethylenically unsaturated monomer are known as disclosed in Japanese Unexamined Patent Application, First Publication No. Hei 03-002212 and Japanese Unexamined Patent Application, First Publication No. Hei 04-202410.

Unsaturated polyester resin compositions comprising an unsaturated polyester and an ethylenically unsaturated monomer, wherein PET is used as a raw material, are also known as disclosed in Japanese Unexamined Patent Application, First Publication No. Hei 08-151438 and Japanese Unexamined Patent Application, First Publication No. Hei 08-295729.

However, none of these resin compositions of the prior art were produced by effective utilization of waste PET, but they were produced using a conventional industrial raw material.

BRIEF SUMMARY OF THE INVENTION

An object of the present invention is to provide a practical polymerizable unsaturated polyester resin composition, wherein a polyester skeleton derived from collected PET is introduced, for effective utilization of waste PET such as a PET bottle which has recently been considered a large obstacle to environmental protection.

Another object of the present invention is to provide a polymerizable unsaturated polyester resin composition having excellent elongation, toughness, flexibility, and strength by using collected PET as an essential raw component.

To solve the problems described above, the present inventors have made intensive studies into the development of a polymerizable unsaturated polyester resin obtained by using collected PET as an essential raw component, thus completing the present invention.

Namely, the present invention provides a polymerizable unsaturated polyester resin composition comprising a straight-chain polyester (A) having a (meth)acryloyl group at both ends of molecules and an ethylenically unsaturated monomer (B), said straight-chain polyester (A) having a (meth)acryloyl group at both ends of molecules being obtained by reacting (a) a terephthalate oligomer having a hydroxyl group at both ends of molecules resulted from the alcoholysis reaction of collected waste polyethylene terephthalate by an aliphatic glycol having an ether bond, (b) a dibasic acid containing an aromatic dibasic acid as a principal component and (c) a glycidyl (meth)acrylate.

The resin composition of the present invention is particularly excellent for use as a resin for coating material because of its excellent performances such as elongation, toughness, flexibility, low-temperature curing property, strength, air-drying property, and low shrinkage property. The present invention provides a chemical recycling method and an effective utilization method as a method of treating waste PET bottles, which has recently been considered as a large problem in view of environmental protection.

DETAILED DESCRIPTION OF THE INVENTION

Figure 1:
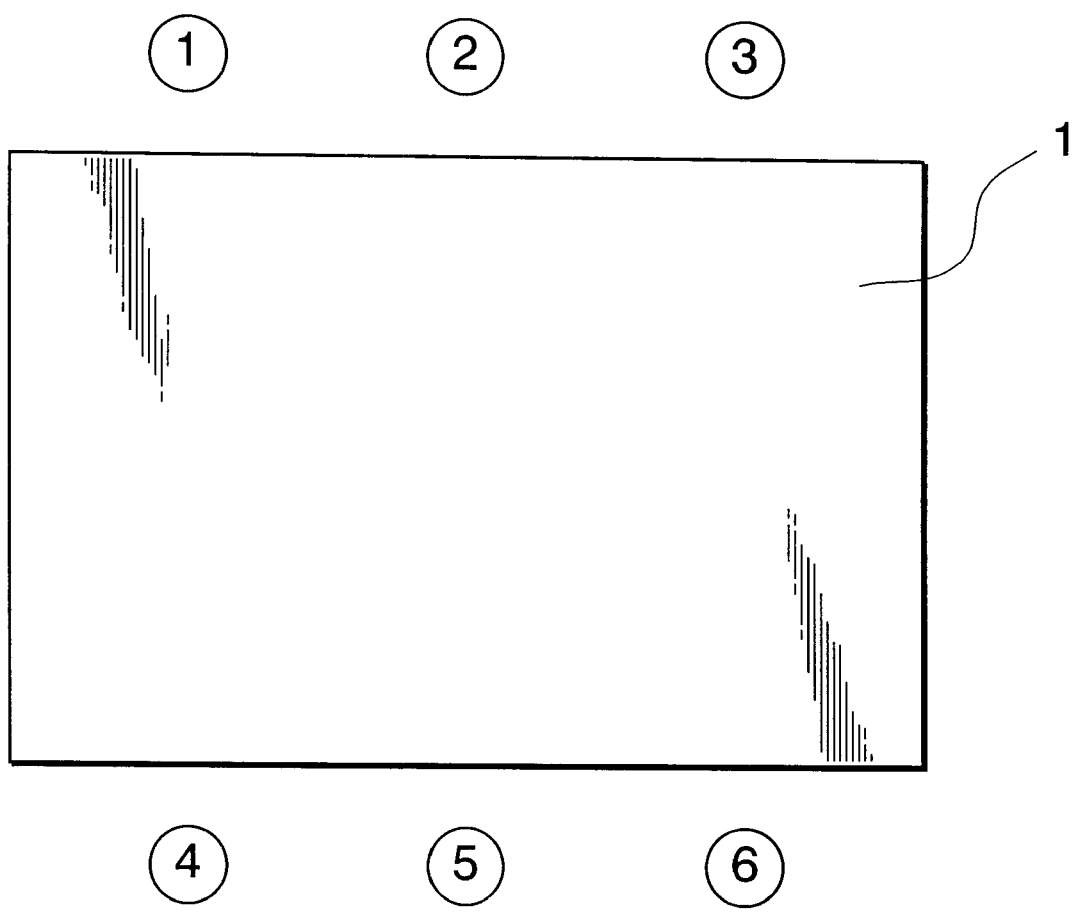
FIG. 1 shows positions of six points where the warpage height of a tin plate after curing was measured when the tin plate having a size of 20 cm×30 cm of Example 7 was coated with a coating material comprising the resin composition of the present invention and an aggregate with a thickness of 4 mm.

The collected waste PET used in the present invention includes, for example, chemical fibers, engineering plastics, containers for beverages, and molding trim scraps. In the present invention, a pulverized form of collected PET is used. This pulverized form of the collected waste PET preferably has a size of 1–20 mm in length and 1–20 mm in width. The collected waste PET used in the present invention also includes, as a raw material, those which contain terephthalic acid and ethylene glycol as a principal component and also contains other saturated dibasic acids such as isophthalic acid, cyclohexane dimethanol, or other glycols such as diethylene glycol as other component.

The aliphatic glycol having an ether bond for alcoholysis reaction of PET used in the present invention preferably includes diethylene glycol, triethylene glycol, and dipropylene glycol. These glycols can be used as a principal component (50% by weight or more of the whole glycol component) and other glycols, for example, glycols described below such as ethylene glycol and propylene glycol can be used as far as the object of the present invention is not adversely affected.

The terephthalate oligomer (a) having hydroxyl groups at both ends of molecules, which is produced by the alcoholysis reaction, used in the present invention is represented by EG-(TPA-EG or Gly)$_n$, and is preferably a mixture of glycols wherein n is 1 to 5. In the formula, the reference letter Gly represents an aliphatic glycol having an ether bond, EG represents ethylene glycol, and TPA represents terephthalic acid.

Preferably, the terephthalate oligomer contains the following two kinds of components (n=2 to 3):
  (i) EG-TPA-Gly-TPA-EG, and
  (ii) EG-TPA-Gly-TPA-EG-TPA-Gly, in the amount of 50% by weight or more based on the terephthalate oligomer as the component (a). When the alcoholysis reaction is carried out, the amount of the aliphatic glycol having an ether bond is 1 mol or more, and preferably from 1 to 10 mol, per unit (molecular weight: 192) of terephthalic acid/ethylene glycol. In the terephthalate oligomer (a), other glycols described below may be added, if necessary, in addition to the terephthalate oligomer and the aliphatic glycol having an ether bond.

Although the dibasic acid (b) used in the present invention contains an aromatic dibasic acid, preferably phthalic anhydride, as a principal component, unsaturated dibasic acid and saturated dibasic acid can be used in combination in order to control physical properties of the resulting resin.

In order to prepare a soft resin, wherein a tensile elongation of a cast cured plate as measured in accordance with Japanese Industrial Standard K-6251 is preferably from 80 to 300%, from the polymerizable unsaturated resin composition of the present invention, the content of a structural unit of the aromatic dibasic acid in the straight-chain polyester (A) is controlled within a range from 15 to 60% by weight. To obtain a resin cured product having such a tensile elongation, an unsaturated dibasic acid is not used in combination. In that case, the content of a structural unit of the aliphatic glycol having an ether bond is preferably from 10 to 35% by weight.

In order to prepare a hard resin, wherein a tensile strength of a cast cured plate as measured in accordance with Japanese Industrial Standard K-6251 is preferably from 150 to 1300 kgf/cm$^2$, from the polymerizable unsaturated resin composition of the present invention, the content of a structural unit of the aromatic dibasic acid in the straight-chain polyester (A) is preferably controlled within a range from 1 to 50% by weight, and the content of a structural unit of the unsaturated dibasic acid is preferably controlled within a range from 1 to 30% by weight, To obtain a resin cured product having such a tensile strength, an unsaturated aliphatic dibasic acid is preferably used in combination. In that case, the content of a structural unit of the aliphatic glycol having an ether bond is preferably from 10 to 35% by weight.

The straight-chain polyester (A) having a (meth)acryloyl group at both ends of molecules used in the present invention includes those obtained by the addition reaction of a terminal carboxyl group of a saturated polyester, which is produced by using no unsaturated dibasic acid in the reaction of the terephthalate oligomer (a) and the dibasic acid (b), and a glycidyl (meth)acrylate, and those obtained by addition of glycidyl (meth)acrylate to a terminal carboxyl group of an unsaturated polyester produced by the reaction between the terephthalate oligomer (a) and the dibasic acid (b) comprising an unsaturated dibasic acid and an aromatic dibasic acid.

Examples of the glycol used in the straight-chain polyester (A) used in the present invention include alkylene glycols such as ethylene glycol, propylene glycol, 1,3-propanediol, 2-methyl-1,3-propanediol, 1,2-butanediol, 1,3-butanediol, 1,4-butanediol, neopentyl glycol, 1,6-hexanediol, dichlorohexanedimethanol, and 2,4,4-trimethyl-1,3-pentanediol; polyalkylene glycols such as diethylene glycol, polyethylene glycol, dipropylene glycol, polypropylene glycol, and polybutylene glycol; and adducts of an alkylene oxide such as ethylene oxide or propylene oxide to a dihydric phenol such as bisphenol A, bisphenol F, bisphenol S or tetrabromobisphenol A.

Examples of the dibasic acid include ortho-phthalic acid, terephtalic acid, isophthalic acid, tetrahydrophtalic acid, hexahydrophthalic acid, endomethylenene tetrahydrophtalic acid, tetrachlorophthalic acid, tetrabromophthalic acid, nitrophthalic acid, malonic acid, succinic acid, adipic acid, azelaic acid, 1,12-dodecane diacid, himic acid, HET acid, 2,6-naphthalenedicarboxylic acid, 2,7-naphthalenedicarboxylic acid, 4,4,'-biphenyldicarboxylic acid, and acid anhydrides thereof.

Examples of the unsaturated aliphatic dibasic acid in the unsaturated polyester include maleic anhydride, fumaric acid, itaconic acid, citraconic acid, and chloromaleic acid.

A number-average molecular weight of the straight-chain polyester (A) having (meth)acryloyl groups at both ends of molecules used in the present invention is preferably from 1500 to 3000, and particularly preferably from 1800 to 2800. When the molecular weight is lower than 1500, the tackiness is imparted to resulting cured product and physical properties such as strength is not good enough. On the other hand, when the molecular weight is higher than 3000, the curing time increases and the productivity is lowered.

As the ethylenically unsaturated monomer (B) used in the present invention, an unsaturated monomer or oligomer capable of copolymerizing with the straight-chain polyester (A) having a (meth)acryloyl group at both ends of molecules is used. A (meth)acrylic acid monoester monomer having one (meth)acryloyl group in a molecule is particularly preferred. Specific examples thereof include methyl (meth)acrylate, ethyl (meth)acrylate, n-butyl (meth)acrylate, isobutyl acrylate, t-butyl acrylate, 2-ethylhexyl acrylate, n-octyl acrylate, decyl acrylate, 2-hydroxyethyl acrylate, 2-hydroxypropyl acrylate, β-ethoxyethyl acrylate, 2-cyanoethyl acrylate, cyclohexyl acrylate, diethylaminoethyl acrylate, hexyl methacrylate, decyl methacrylate, lauryl methacrylate, stearyl methacrylate, 2-hydroxyethyl methacrylate, 2-hydroxypropyl methacrylate, p-t-butylcyclohexyl methacrylate, phenylcarbitol acrylate methacrylate, nonylphenylcarbitol acrylate, nonylphenoxypropyl acrylate, N-vinylpyrolidone, polycaprolactone acrylate, acryloyloxyethyl phthalate, acryloyloxy succinate, dicyclopentenyl acrylate, dicyclopentenyloxyethyl acrylate, tricyclodecanyl acrylate, tricyclodecanyl methacrylate, and tris(2-hydroxyethyl) isocyanuracrylate.

As the ethylenically unsaturated monomer (B) used in the present invention, a polyfunctional unsaturated monomer having at least two polymerizable double bonds in a molecule, which is used together with the ethylenically unsaturated monomer having one (meth)acryloyl group, can be used in combination. This kind of the monomer is used for the purpose of improving the wear resistance, scratch resistance, slide resistance and chemical resistance of the surface of the cured product. The polyfunctional unsaturated polymer is preferably a polyfunctional (meth)acrylate monomer. Examples thereof include alkanediol di(meth)acrylate (e.g. ethylene glycol di(meth)acrylate, 1,2-propylene glycol di(meth)acrylate, 1,3-butylene glycol di(meth)acrylate, 1,6-hexanediol di(meth)acrylate, etc.), polyoxyalkylene-glycol di(meth)acrylate (e.g. dipropylene glycol di(meth)acrylate, triethylene glycol (meth)acrylate, tetraethylene glycol di(meth)acrylate, polyethylene glycol (meth)acrylate, etc.), divinylbenzene, diallyl phthalate, triallyl phthalate, triallyl cyanurate, triallyl isocyanurate, allyl (meth)acrylate, and diallyl fumarate. These monomers are used alone or in combination.

As the unsaturated monomer used together with the ethylenically unsaturated monomer having one (meth)acryloyl group, which is the ethylenically unsaturated monomer (B), a polymerizable unsaturated monomer having the air-drying property can also be used in combination. Examples thereof include acrylic acid derivative (e.g. dicyclopentadiene, tricyclodecane, etc.), dicyclopentenyloxyethyl acrylate, and tricyclo[5-2-1-02,6]decanyl acrylate.

As the unsaturated monomer used together with the ethylenically unsaturated monomer having one (meth)acryloyl group, which is the ethylenically unsaturated monomer (B), an unsaturated alcohol monomer can also be used in combination. This unsaturated alcohol monomer is a monomer having a (meth)acryloyl group and a hydroxyl group, and specific examples thereof include 2-hydroxyethyl methacrylate, hydroxypropyl methacrylate, 2-hydroxyethyl acrylate, and hydroxypropyl acrylate.

Vinyl monomers other than these ethylenically unsaturated monomer, for example, styrene, vinyltoluene, and α-methylstyrene may be used in combination.

In the polymerizable unsaturated polyester resin composition of the present invention, a mixing ratio of the straight-chain polyester (A) having (meth)acryloyl groups at both ends of molecules to the ethylenically unsaturated monomer (B) is from 20–80% by weight:80–20% by weight, and preferably from 30–70% by weight:70–30% by weight.

The polymerizable unsaturated polyester resin composition of the present invention can be prepared by the following procedure. That is, the alcoholysis reaction is conducted by heating collected PET and an aliphatic glycol having an ether bond in a nitrogen atmosphere at a temperature preferably within a range from 200 to 260° C. to obtain a terephthalate oligomer (a). Then, the esterification reaction is conducted by heating the terephthalate oligomer (a), a dibasic acid (b) containing an aromatic dibasic acid as a principal component, and, if necessary, another dihydric alcohol in a nitrogen atmosphere at a temperature preferably within a range from 190 to 220° C. to obtain a straight-chain polyester having carboxyl groups at both ends of molecules. Then, the addition reaction between carboxyl groups at both ends of the straight-chain polyester and a glycidyl (meth)acrylate is conducted at a temperature preferably within a range from 120 to 140° C. to obtain a straight-chain polyester (A) having a (meth)acryloyl group at both ends of molecules. This straight-chain polyester (A) having (meth)acryloyl groups at both ends of molecules is dissolved in an ethylenically unsaturated monomer (B) to obtain a polymerizable unsaturated polyester.

When using in applications such as coating material and paving material, an air-drying unsaturated polyester capable of imparting the air-drying property is preferably used in combination with the polymerizable unsaturated polyester resin composition of the present invention. The air-drying unsaturated polyester is preferably a compound having an air-drying functional group, for example, an unsaturated polyester obtained by using a glycol having an allyl ether group (e.g. ethylene glycol monoallyl ether, diethylene glycol monoallyl ether, etc.), a dibasic acid having a cyclic aliphatic group (e.g. tetrahydrophthalic anhydride, endomethylene tetrahydrophthalic anhydride, methyltetrahydrophthalic anhydride, cis-3-methyl-4-cyclohexene-cis-1,2-dicarboxylic acid, etc.), a glycol, an unsaturated dibasic acid, and a saturated dibasic acid.

When using the air-drying unsaturated polyester (C) in combination with the polymerizable unsaturated polyester resin composition of the present invention, the straight-chain polyester (A) having a (meth)acryloyl group at both ends of molecules and the air-drying unsaturated polyester (C) are preferably used in the present invention in a weight ratio (A):(C) of 90–50%:10–50% by weight. When the content of (C) is smaller than 10% by weight, the surface drying property of the resin cured product becomes inferior. On the other hand, when the content of (C) is larger than 50% by weight, properties of the resin cured product, such as tensile strength, tear strength, water resistance, and moist heat resistance become inferior, which is not preferred.

A mixing weight ratio [(A+C):B] of the polymer component (A+C) of the straight-chain polyester (A) having a (meth)acryloyl group at both ends of molecules and the air-drying unsaturated polymer used in the present invention to the ethylenically unsaturated monomer (B) is preferably from 20–80%:80–20% by weight. When the content of (A+C) is smaller than 20% by weight, the curing property of the resin cured product becomes inferior.

The polymerizable unsaturated polyester resin of the present invention preferably contains aggregates when used in applications such as paving material and mortar. These aggregates are fine aggregate and/or coarse aggregate and are, for example, natural stones such as crushed stone, sand stone, white marble, marble, quartz, granite, limestone, and silica. Sands such as silica sand and river sand are preferably used as the fine aggregate. For the purpose of weight reduction, light-weight aggregates such as sintered shale, pearlite, shirasu-balloon, and glass balloon can be used. It is also possible to use silica sand No. 1 (average particle diameter: 5 to 2.5 mm), silica sand No. 2 (average particle diameter: 2.5 to 1.2 mm), silica sand No. 3 (average particle diameter: 1.2 to 0.6 mm), silica sand No. 4 (average particle diameter: 0.6 to 0.3 mm), silica sand No. 5 (average particle diameter: 0.3 to 0.15 mm), silica sand No. 6 (average particle diameter: 0.15 to 0.074 mm), and silica sand No. 7 (average particle diameter: 0.074 mm or less) defined in JIS G 5901-1968. An average particle diameter of the aggregate is preferably from 0.05 to 20 mm, and more preferably from 0.1 to 10 mm. The amount thereof is preferably from 20 to 92.5% by weight based on the unsaturated polyester resin composition.

It is recommended that the polymerizable unsaturated polyester resin composition of the present invention contain a polymerization inhibitor for the purpose of preventing gelation and controlling the storage stability and curing property of the resin formed. Typical examples of the polymerization inhibitor include hydroquinones such as hydroquinone, p-t-butyl catechol, and mono-t-butyl hydroquinone; phenols such as hydroquinone monomethyl ether and di-t-butyl-p-cresol; quinones such as p-benzoquinone, naphthoquinone, and p-toluquinone; and copper salts such as copper naphthenate.

For the purpose of reducing curing shrinkage of the resin cured product, a thermoplastic resin can be added to the polymerizable unsaturated resin composition of the present invention. Specific examples of the thermoplastic resin include lower alkyl esters of acrylic or methacrylic acid, such as methyl methacrylate, ethyl methacrylate, butyl methacrylate, methyl acrylate, and ethyl acrylate; homopolymers or copolymers of monomer such as styrene, vinyl acetate, and vinyl acetate; copolymers of at least one of polymers composed of at least one of vinyl monomers described above and lauryl methacrylate, isovinyl methacrylate, acrylamide, methacrylamide, hydroxyalkyl (meth)acrylate, acrylonitrile, methacrylonitrile, acrylic acid, methacrylic acid, and cetylstearyl methacrylate; and cellulose acetate butylate, cellulose acetate propionate, polyethylene, polypropylene, and saturated polyester. The amount thereof is preferably from 0 to 50 parts, and particularly preferably form 0 to 35 parts by weight, based on 100 parts by weight of the resin composition.

For the purpose of improving the drying property, paraffins and/or waxes may be used in combination with the polymerizable unsaturated polyester resin composition of the present invention.

The paraffin and/or wax used in the present invevntion include, for example, paraffin wax, polyethylene wax, and higher fatty acid such as stearic acid or 1,2-hydroxystearic acid. Preferably, paraffin wax is used. The amount of the paraffin and/or wax is from 0.1 to 5 parts by weight, and preferably from 0.2 to 2 parts by weight, based on 100 parts by weight of the total of the components (A), (B) and (C).

The polymerizable unsaturated polyester resin composition of the present invention is usually cured by adding a polymerization initiator. As the polymerization initiator, a heat polymerization initiator can be used. In some case, a photopolymerization initiator may be used. The amount of the polymerization initiator is usually from 0.1 to 10 parts by weight, and preferably from 1 to 5 parts by weight, based on 100 parts by weight of the unsaturated polyester resin composition.

Also it is possible to add a curing accelerator, namely, a substance capable of decomposing an organic peroxide as the curing agent by means of the redox reaction, thereby promoting generation of active radicals. Examples of the curing accelerator include metal soaps such as cobalt, vanadium and manganese soaps; tertiary amines; quaternary ammonium salts; and mercaptanes.

The polymerization initiator is an organic peroxide. Specifically, known polymerization initiator such as diacyl peroxide, peroxy ester, hydro peroxide, dialkyl peroxide, ketone peroxide, peroxyketal, alkyl perester and percarbonate polymerization initiators can be used and are appropriately used according to the kneading conditions and cure temperature.

Examples of the photopolymerization initiator include benzoin ether photopolymerization initiators such as benzoin alkyl ether; benzophenone photopolymerization initiators such as benzophenone, benzyl, and methylorthobenzoyl benzoate; acetophenone photopolymerization initiators such as benzyl methyl ketal, 2,2-diethoxyacetophenone, 2-hydroxy-2-methylpropiophenone, 4-isopropyl-2-hydroxy-2-methylpropiophenone, and 1,1-dichloroacetophenone; and thioxanthone photopolymerization initiators such as 2-chlorothioxanthone, 2-methylthioxanthone, and 2-isopropylthioxanthone.

Examples of the curing accelerator include organometallic salts such as cobalt naphthenate, cobalt octylate, vanadyl octylate, copper naphthenate, and barium naphthenate. Examples of the amines include dimethylaniline, N,N-diethylaniline, N,N-dimethyparatoluidine, N,N-dihydroxyethylparatoluidine, N-ethyl-metatoluidine, triethanolamine, metatoluidine, diethylenetriamine, pyridine, phenylmorpholine, piperidine, and diethanolaniline.

The amount of the curing accelerator is an amount which is usually employed, and is preferably from 0.01 to 4 parts by weight based on 100 parts by weight of the unsaturated polyester resin composition. The polymerization initiator described above may be used in combination.

In addition to the additives described above, fiber reinforcements, and colorants such as pigments and dyes may be added to the polymerizable unsaturated polyester resin composition of the present invention.

In the polymerizable polyester resin composition of the present invention, fiber reinforcements are preferably used when used in applications such as molding material and waterproof material. Examples of the fiber reinforcement include glass fibers, organic fibers made of amide, aramid, vinylon, polyester and phenol, carbon fibers, metal fibers, ceramic fibers, and combinations thereof. In view of workability and economical efficiency, glass fibers and organic fibers are preferred. Examples of the form of the fibers include plain weave, satin weave, nonwoven fabric, and mat weave. Mat weave is preferred according to the execution method, thickness retention or the like. It is also possible to use chopped strands obtained by cutting a glass roving into pieces of 20 to 100 mm in length.

In the polymerizable polyester resin composition of the present invention, filers are preferably used when used in applications such as patty, sealing material, coating material, waterproof material, and molding material. Examples of the filler include known fillers such as calcium carbonate powder, clay, alumina powder, silica sand powder, talc, barium sulfate, silica powder, glass powder, glass beads, mica, aluminum hydroxide, cellulose yarn, silica sand, river sand, white marble, marble scrap, and crushed stone. Preferred fillers are glass powder, aluminum hydroxide, and barium sulfate because the translucency is imparted on curing.

The polymerizable unsaturated polyester resin composition of the present invention is used in applications such as material for reinforcing a cloth or Kraft paper by impregnation. It is also possible to add other additives such as zinc stearate, titanium white, zinc white, and various pigment stabilizers, and flame retardants.

The polymerizable unsaturated polyester resin composition of the present invention can be used in applications such as coating material, patty, sealing material, lining material, waterproof material, road marking material, and paving material.

EXAMPLES

The following Examples further illustrate the present invention, but the present invention is not limited to these Examples. In the following Examples, "parts" and "percentages" are by weight unless otherwise specified.

Synthesis Example 1
(Synthesis of Saturated Polyester Methacrylate (A-1))

In a 5-liter three-necked flask equipped with a thermometer, a stirrer, and a condenser, 1229.6 g (11.6 mol) of diethylene glycol, 1536 g (corresponding to 8 mol each of terephthalic acid/ethylene glycol) of pulverized PET bottle, and 1.38 g of dibutyltin oxide were charged and heated to 220° C. in a nitrogen atmosphere. The reaction continued at the same temperature for four hours, and after cooling to 120° C. when the solid acid value reached 3.5, 1776 g (12.0 mol) of phthalic anhydride was charged and heated to 210° C. The reaction continued at the same temperature for 6.5 hours, and 0.514 g of toluhydroquinone was added when a 70% styrene (hereinafter abbreviated as SM) solution exhibited an acid value of 23.5 and a Gardner viscosity of U-V', and after cooling to 130° C., 379.7 g (2.67 mol) of glycidyl methacrylate was charged in an atmosphere of nitrogen/air= 1:1. The reaction continued at 130° C. for two hours, and after cooling to 90° C. when the solid acid value of a 75% methyl methacrylate (hereinafter abbreviated as MMA) solution reached 2.0, 1568.4 g of MMA, 0.087 g of 5% copper naphthenate and 0.291 g of t-butyl catechol were added to obtain a liquid resin having a non-volatile content of 75%.

Synthesis Example 2
(Synthesis of Unsaturated Polyester Methacrylate (A-2))

In a 5-liter three-necked flask equipped with a thermometer, a stirrer, and a condenser, 763.2 g (7.2 mol) of diethylene glycol, 691.2 g (corresponding to 3.6 mol each of terephthalic acid/ethylene glycol) of pulverized PET bottle, and 0.73 g of dibutyltin oxide were charged and heated to 220° C. in a nitrogen atmosphere. The reaction continued at the same temperature for 4.5 hours, and after cooling to 120° C. when the solid acid value reached 0.2, 801.4 g (7.56 mol) of diethylene glycol, 1598.4 g (10.8 mol) of phthalic anhydride, 441 g (4.5 mol) of maleic anhydride, and 2.148 g of trimethylhydroquinone were charged and heated to 210° C. The reaction continued at the same temperature for 15.5 hours, and 0.558 g of toluhydroquinone was added when a 70% SM solution exhibited an acid value of 12.3 and a Gardner viscosity of Y–Z', and after cooling to 130° C., 182.4 g (1.28 mol) of glycidyl methacrylate was charged in an atmosphere of nitrogen/air=1:1. The reaction continued at 130° C. for one hour, and after cooling to 90° C. when the acid value of a 75% MMA solution reached 1.4, 1267.7 g of MMA and 0.112 g of copper naphthenate were added to obtain a liquid resin having a non-volatile content of 75%.

Synthesis Example 3
(Preparation of Saturated Polyester Methacrylate (A-3))

The reaction was conducted in the same manner as in Synthesis Example 1, and after the completion of the reaction, 2016.6 g of styrene (SM), 0.093 g of 5% copper naphthenate and 0.312 g of t-butyl catechol were added to obtain a liquid resin having a non-volatile content of 70%.

Synthesis Example 4
(Preparation of Unsaturated Polyester Methacrylate (A-4))

The reaction was conducted in the same manner as in Synthesis Example 2, and after the completion of the reaction, 1800.9 g of styrene (SM), 0.100 g of 5% copper naphthenate and 0.334 g of t-butyl catechol were added to obtain a liquid resin having a non-volatile content of 70%.

Synthesis Example 5
(Preparation of Saturated Polyester (C-1) Capable of Imparting an Air-Drying Property)

In a 5-liter three-necked flask equipped with a thermometer, a stirrer, and a condenser, 1407 g (9.38 mol) of triethylene glycol, 489.72 g (4.62 mol) of diethylene glycol, 752.2 g (4.9 mol) of phthalic anhydride, 1162 g (7.0 mol) of PMAA, 1.88 g of dibutyltin oxide, and 0.51 g of toluhydroquinone were charged and heated to 205° C. in a nitrogen atmosphere. The reaction continued at the same temperature for 12 hours, and after cooling to 120° C. when a 70% SM solution exhibited an acid value of 10.2, 205.8 g (2.1 mol) of maleic anhydride was charged and heated to 190° C. The reaction continued at the same temperature for 5.5 hours, and 1245.9 g of MMA, 0.074 g of 5% copper naphthenate, and 0.25 g of t-butyl catechol were added when a 75% MMA solution exhibited an acid value of 19.2 and a Gardner viscosity of V, to obtain a liquid resin having a non-volatile content of 75%.

Comparative Synthesis Example 1
(Synthesis of Saturated Polyester Methacrylate (EA-1))

In a 5-liter three-necked flask equipped with a thermometer, a stirrer, and a condenser, 1302 g (8.68 mol) of triethylene glycol, 589.72 g (4.62 mol) of diethylene glycol, 2072 g (14 mol) of phthalic anhydride, and 1.93 g of dibutyltin oxide were charged and heated to 205° C. in a nitrogen atmosphere. The reaction continued at the same temperature for 16 hours, and 0.528 g of toluhydroquinone was added when a 70% SM solution exhibited an acid value of 19.1 and a Gardner viscosity of Q-R, and after cooling to 110° C., 255.3 g (1.8 mol) of glycidyl methacrylate was charged in an atmosphere of nitrogen/air=1:1. The reaction continued at 130° C. for 2.5 hours, and after cooling to 90° C. when a 75% MMA solution exhibited an acid value of 1.9, 1293.2 g of MMA, 0.079 g of 5% copper naphthenate, and 0.264 g of t-butyl catechol were added to obtain a liquid resin having a non-volatile content of 75%.

Comparative Synthesis Example 2
(Synthesis of Unsaturated Polyester Methacrylate (EA-2))

In a 5-liter three-necked flask equipped with a thermometer, a stirrer, and a condenser, 1590 g (15 mol) of diethylene glycol, 1776 g (12 mol) of phthalic anhydride, 367.5 g (3.75 mol) of maleic anhydride, 1.795 g of trimethylhydroquinone, and 1.795 g of dibutyltin oxide were charged and heated to 210° C. in a nitrogen atmosphere. The reaction continued at the same temperature for 4.5 hours, and after cooling to 120° C. when the acid value reached 0.2, 801.4 g (7.56 mol) of diethylene glycol was charged and heated to 210° C. The reaction continued at the same temperature for 35 hours, and after cooling to 90° C. when a 70% SM solution exhibited an acid value of 10.2 and a Gardner viscosity of Y'-Z, 129.8 g (0.91 mol) of glycidyl methacrylate was charged in an atmosphere of nitrogen/air= 1:1. The reaction continued at 130° C. for one hour, and after cooling to 90° C. when a 75% MMA solution exhibited an acid value of 2.5, 1193.26 g of MMA and 0.15 g of 5% copper naphthenate were added to obtain a liquid resin having a non-volatile content of 75%.

Examples 1 to 2
(Evaluation as a Coating Material)

Each of the resins obtained in Synthesis Examples 1 to 3 and Comparative Synthesis Examples 1 to 2 was incorporated and a predetermined amount of a curing agent was added to form a coat of 2 mm in thickness, and then a coat drying property test and a tensile test were conducted. The evaluation results are shown in Table 1.

TABLE 1

| Examples | Example 1 Resin-1 | Example 2 | Comp. Example 1 Resin-2 | Comp. Example 2 |
|---|---|---|---|---|
| A-1 | 76 | | | |
| A-2 | | 74 | | |
| EA-1 | | | 74 | |
| EA-2 | | | | 60.7 |
| C | 13 | 13 | 13 | 19 |
| MMA | | 9 | 9 | 15.4 |
| n-BA | 11 | 7 | | 5 |
| 2-EHA | | | 4 | |
| 6% Co-Nap | 0.5 | 0.5 | 0.5 | 0.5 |
| PTD-2EO | 0.3 | 0.3 | 0.3 | 0.3 |
| 115F WAX | 0.025 | 0.025 | 0.025 | 0.025 |
| 120F WAX | 0.025 | 0.025 | 0.025 | 0.025 |
| 125F WAX | 0.025 | 0.025 | 0.025 | 0.025 |
| 130F WAX | 0.025 | 0.025 | 0.025 | 0.025 |
| Coat-drying property (2 mm) | 1.5 h | 1.5 h | 1.5 h | 1.5 h |
| Tensile strength (kgf/cm$^2$) | 112 | 164 | 73 | 100 |
| Elongation (%) | 205 | 152 | 200 | 100 |

Examples 3 to 4
(Physical Properties 1 of a Cast Sheet)

Each of the resins obtained in Synthesis Examples 1 to 2 and Comparative Synthesis Examples 1 to 2 was incorporated and a predetermined amount of a curing agent was added to form a cast sheet of 3 mm in thickness, and then a tensile test was conducted. The evaluation results are shown in Table 2.

TABLE 2

| Examples | Example 3 | Example 4 | Comp. Example 3 | Comp. Example 4 |
|---|---|---|---|---|
| A-1 | 100 | | | |
| A-2 | | 86.7 | | |
| EA-1 | | | 100 | |
| EA-2 | | | | 86.7 |

TABLE 2-continued

| Examples | Example 3 | Example 4 | Comp. Example 3 | Comp. Example 4 |
|---|---|---|---|---|
| MMA | | 8.3 | | 8.3 |
| n-BA | | 5 | | 5 |
| PTD-2EO | 0.08 | 0.08 | 0.08 | 0.08 |
| Tensile strength (kgf/cm$^2$) | 1.74 | 4.50 | 0.46 | 2.6 |
| Elongation (%) | 134 | 96 | 220 | 74 |

Examples 5 to 6
(Physical Properties 2 of a Cast Sheet)

Each of the resins obtained in Synthesis Examples 3 to 4 was incorporated and a predetermined amount of a curing agent was added to form a cast sheet of 3 mm in thickness, and then a bending test and a tensile test were conducted. The evaluation results are shown in Table 3.

TABLE 3

| Examples | Example 5 | Example 6 |
|---|---|---|
| A-3 | 100 | |
| A-4 | | 100 |
| PTD-2EO | 0.08 | 0.08 |
| Tensile strength (kgf/cm$^2$) | 1.9 | 7.6 |
| Elongation (%) | 146 | 4 |
| Bending strength (kgf/cm$^2$) | 1.8 | 12.1 |

Example 7
(Low Shrinkage Property of Mortar)

Each of the resins obtained in Example 1 and Comparative Example 1, a resin 1 and a resin 2, and an aggregate were incorporated and a predetermined amount of a curing agent was added. The mixture was cast and spread over a tin plate 1 having a size of 20 cm×30 cm with a thickness of 4 mm. Curing shrinkage of each resin mortar was determined by measuring a warpage height of the tin plate 1 after curing at six points as shown in FIG. 1. The evaluation results are shown in Table 4.

TABLE 4

| Examples | Example 7 | Comp. Example 5 |
|---|---|---|
| Resin-1 | 50 | |
| Resin-2 | | 50 |
| PTD-2EO | 0.04 | 0.04 |
| 40% BPO paste | 0.8 | 0.8 |
| Silica sand No. 6 | 30 | 30 |
| Silica sand No. 8 | 40 | 40 |
| Calcium carbonate (NS-200) | 30 | 30 |
| Warpage height (mm) | | |
| ① | 4.0 | 4.5 |
| ② | 1.5 | 6.0 |
| ③ | 6.0 | 8.0 |
| ④ | 5.0 | 8.5 |
| ⑤ | 3.0 | 6.0 |
| ⑥ | 1.0 | 4.0 |
| Average | 3.4 | 6.2 |

The Abbreviations used in the respective tables described above are as follows.

MMA: Methyl methacrylate
n-BA: n-butyl acrylate
2-EHA: 2-ethylhexyl acrylate
6% Co—NaP: 6% cobalt naphthenate
PTD-2EO: N,N-dihydroxyethylparatouidine As is apparent from the results of Table 1 to Table 4, any of Examples 1 to 7 shows numerical values better than those of Comparative Examples 1 to 5.

What is claimed is:

1. A polymerizable unsaturated polyester resin composition comprising:
   straight-chain polyester molecules (A) having a (meth) acryloyl group at each end thereof and ethylenically unsaturated monomer (B),
   said straight-chain polyester molecules (A) being obtained by reacting:
   (a) terephthalate oligomer molecules having a hydroxyl group at each end thereof resulting from an alcoholysis reaction of collected waste polyethylene terephthalate by an aliphatic glycol having an ether bond,
   (b) a dibasic acid containing an aromatic dibasic acid as a principal component, and
   (c) a glycidyl (meth)acrylate
   wherein the content of a structural unit of the aromatic dibasic acid (b) in the straight-chain polyester molecules (A) is from 15 to 60% by weight, and the content of a structural unit of the aliphatic glycol having an ether bond is from 10 to 35% by weight.

2. A polymerizable unsaturated polyester resin according to claim 1, wherein the tensile elongation of a cast cured plate as measured in accordance with Japanese Industrial Standard K-6251 is from 80 to 300%.

3. A polymerizable unsaturated polyester resin composition according to claim 1, which further comprises an aggregate and is used as a mortar.

4. A polymerizable unsaturated polyester resin composition according to claim 1, which furhter comprises an air-drying unsaturated polyester and is used as a coating material.

5. A polymerizable unsaturated polyester resin composition comprising:
   straight-chain polyester molecules (A) having a (meth) acryloyl group at each end thereof and ethylenically unsaturated monomer (B),
   said straight-chain polyester molecules (A) being obtained by reacting:
   (a) terephthalate oligomer molecules having a hydroxyl group at each end thereof resulting from an alcoholysis reaction of collected waste polyethylene terephthalate by an aliphatic glycol having an ether bond,
   (b) a dibasic acid containing an aromatic dibasic acid as a principal component, and
   (c) a glycidyl (meth)acrylate
   wherein the content of a structural unit of the aromatic dibasic acid (b) in the straight-chain polyester molecules (A) is from 1 to 50% by weight, the content of a structural unit of unsaturated aliphatic dibasic acid is from 1 to 30% by weight, and the content of a structural unit of the aliphatic glycol having an ether bond is from 10 to 35% by weight.

6. A polymerizable unsaturated polyester resin according to claim 5, wherein the tensile strength of a cast cured plate as measured in accordance with Japanese Industrial Standard K-6251 is from 150 to 1300 kgf/cm$^2$.

7. A polymerizable unsaturated polyester resin composition according to claim 5, which further comprises an aggregate and is used as a mortar.

8. A polymerizable unsaturated resin composition according to claim 5, which further comprises an unsaturated polyester which dries in air and is used as a coating material.

* * * * *